Oct. 18, 1955     W. F. LANDRUM     2,720,720
FISHING DEVICE
Filed Aug. 14, 1952
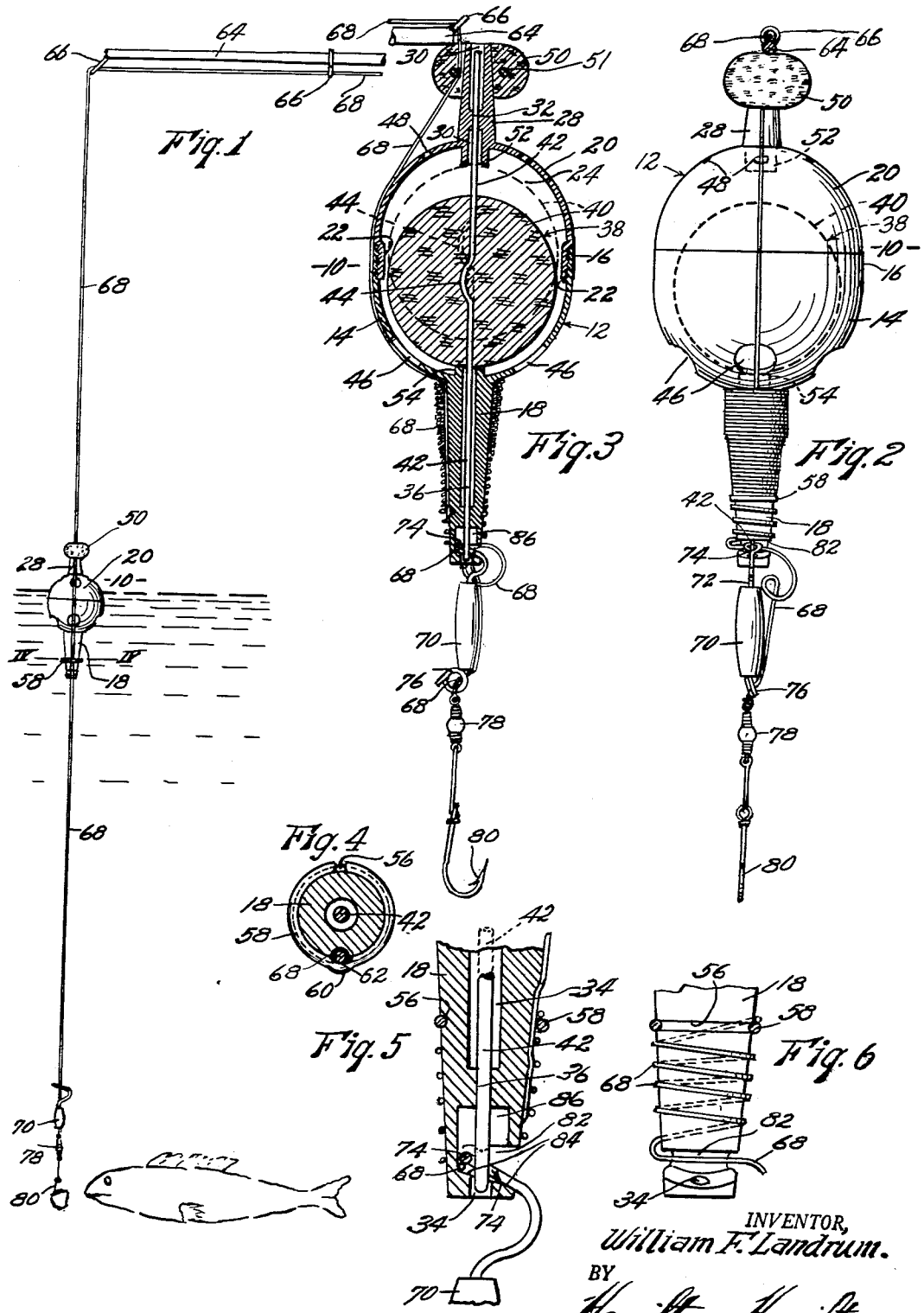
INVENTOR,
William F. Landrum.
BY
Hamilton & Hamilton,
Attorneys.

United States Patent Office

2,720,720
Patented Oct. 18, 1955

2,720,720

FISHING DEVICE

William F. Landrum, Kansas City, Kans.

Application August 14, 1952, Serial No. 304,378

3 Claims. (Cl. 43—43.11)

This invention relates to new and useful improvements in fishing devices, and has particular reference to a float device adapted to permit casting and subsequent fishing at any desired depth. Essentially, the device comprises a buoyant device adapted to be attached to a fishing line at a distance from the hook equal to the desired fishing depth, and about which the portion of line between said device and said hook may be wound and secured releasably, in such a manner that the wound portion of the line is released when the device enters the water.

Other objects are simplicity and economy of structure, ease and efficiency of operation, and adaptability of the portion of the line between the float device and the hook to be reeled in in the usual manner when a fish is caught.

With these objects in view, as well as other objects which will appear in the course of the specification, reference will be had to the drawing, wherein:

Fig. 1 is a general elevational view of the fishing and casting device as used during the fishing operation.

Fig. 2 is an enlarged elevational view of the fishing device and associated parts shown in position for casting.

Fig. 3 is a sectional view of the device as shown in Fig. 2, with the associated parts shown in relation thereto for casting.

Fig. 4 is an enlarged sectional view taken on line IV—IV of Fig. 1.

Fig. 5 is an enlarged detail fragmentary sectional view of the lower portion of the float member with the parts shown in latched position for casting in solid lines and in dotted lines for releasing the sinker member for movement to the desired fishing depth.

Fig. 6 is an enlarged fragmentary elevational view of the lower portion of the float member showing the general relation of the fishing line as it is being wound for latching.

Throughout the several views of the drawing like numerals refer to similar parts and the number 10 designates a fishing device comprising a hollow housing 12 made of a body member 14 of substantially hemispherical shape having an internally threaded flange member 16 and an external depending conical spool member 18. A cover member 20 of hollow hemispherical form has an externally threaded flange 22 which is adapted to be screwed into threaded flange 16 whereby to form a chamber 24 suitable for receiving a float 38. An upwardly extending stem 28 is disposed diametrically of said cover member and is normally in axial alignment with spool 18. A longitudinal hole 30 is formed through stem 28, and is restricted intermediate its ends to present a bearing 32. Conical spool member 18 is also provided with a longitudinal hole 34 and is restricted intermediate its ends to present a bearing 36.

Float 38 comprises a spherical member 40 having a diametrically disposed axle member 42 fixed therein for free sliding movement in bearings 32 and 36. Float 40 is shown made of a suitable light material such as cork. Referring to Fig. 3 it will be noted that the bearings 32 and 36 are relatively narrow and that the major portions of axle 42 are loosely mounted in holes 30 and 34. The body of axle 42 is offset at 44 to anchor it in member 40 so that the axle and float will always move longitudinally in unison.

Body member 14 is provided adjacent its lower portion with water inlet openings 46, and cover member 20 is provided with air vents 48 to facilitate proper movement of the float member in the water. Stem 28 is of frusto-conical shape and is adapted to receive a head 50 thereon for limited adjustment therealong. Head 50 is substantially of torus shape and has a metal ring 51 embedded therein for reinforcement and to limit the movement of the fishing line from cutting through said head member when it is operated through its usual movements during the fishing operations.

Extending axially into chamber 24 to receive axle 42 therethrough is a depending lug 52 and an upstanding lug 54. Float member 40 when not in the water rests on lug 54 with its body member in spaced relation to the inner wall of housing 12, and when positioned in the water, member 40, due to its buoyancy, will move upwardly to contact lug 52 to move axle 42, whereby it will function to secure certain parts in proper relation and to release them at the proper time as hereinafter described. Conical spool member 18 is externally grooved at 56 to receive a resilient open ring 58. This ring is offset at 60 to present an opening 62 between 18 and the ring 58 to permit the free movement of the fishing line 68 therethrough.

This fishing device is used on the usual fishing tackle including a fishing pole 64 having eyelets 66 to receive the fishing line 68, which frictionally carries the float member 10. The outer end portion of line 68 is provided with a sinker or weight 70 fixed on a stem 72 having an upper eyelet 74 and a lower coil 76 through which the fishing line is threaded. The extended end of line 68 is attached to one end of a swivel member 78. The other end of swivel 78 receives the fishhook 80.

Fig. 1 shows the normal position of the fishing tackle during the fishing operation, and with the fishing line fully extended. The lower portion of conical member 18 is transversely notched at 82 to intersect hole 34 and to present an outwardly and downwardly inclined surface 84. Also the opening 34 is enlarged just above said notch to produce a recess 86 whereby proper room is provided to permit free movement of the latching parts. The fishing line 68 passes from the fishing rod, first between head 50 and stem 28, whereby it is frictionally gripped and whereby the float housing is secured to said line for sliding movement along said line. The line then passes around the hollow housing 12, through ring 58 on spool 18, and thence to the sinker and fishhook as previously described.

When it is desired to prepare the device for casting, a length of fishing line 68 equal to the depth at which it is desired to fish is placed between housing 12 and sinker 70. This is accomplished by forcibly pulling the line through head 50. The portion of the line between housing and sinker is then wound on spool 18 until the sinker is closely adjacent the spool. The upper eyelet 74 of the sinker is then inserted into notch 82 of the spool, and the cork 40 is lowered so that the lower end portion of axle 42 of said cork extends through said eyelet, as shown, thereby latching the sinker to the housing. To prevent undesired loosening of the windings of the line on the spool, the last turn of the line may be laid through notch 82, so as to be secured therein by axle 42. Casting may then be performed in the usual manner, with the length of line between the float housing and hook forming no obstacle. When fishing at considerable depths, this length of line would otherwise make casting almost impossible. During the initial throwing movement, before the reel has been released to pay out line, the fact that the float housing is supported from its upper end will cause centrifugal force to hold the cork firmly in the lower portion of the housing, and will hold the sinker firmly latched to the housing. After the reel has been released to pay out line and during the time the float is following its normal trajectory path to the water, there is of course no centrifugal force acting on the cork. However, during this time, the end of the float to which the sinker is connected leads, due both to the weight of the sinker and to the drag of the line on the float, but the cork itself is not directly affected by the line drag since it is free of the line, and therefore due to its inertia presses forwardly, or toward its latching position. When the float housing enters the water, the cork will immediately rise to the upper portion of the housing, since it is buoyant and the housing is non-buoyant. This elevates the lower end of axle 42 out of eyelet 74 of the sinker. The sinker, thus released, sinks to the desired depth, unreeling the line from spool 18.

When a fish is hooked and it is desired to reel it in, the operator reels the line in to take up the slack in line 68 between sinker 70 and the float 10. This is accomplished by first reeling the line in until the float member contacts the end of the fishing pole as shown in Figs. 2 and 3. By continuing the reeling operation the line can be drawn through head 50 until the sinker contacts the lower end of the spool 18. When so positioned the fish can be easily removed from the water.

What I claim as new and desire to protect by Letters Patent is:

1. A fishing device to be used in connection with a fishing line having a sinker attached thereto adjacent its outer end, said device comprising a non-buoyant body member frictionally engageable on said line intermediate a fishing pole and said sinker, said body member having a depending spool portion adapted to receive windings of said line thereabout, a buoyant float member carried movably in said body member, and an axle fixed in said float member and mounted for limited movement in said body member, said axle being normally adapted to engage and secure said sinker in fixed relation to said body member and when deposited in water to release said sinker whereby said sinker will move downwardly to unwind said line from said spool.

2. A fishing device comprising, in combination, a non-buoyant body member having at its lower end a depending hollow spool, said spool having a side notch formed therein adjacent the lower end thereof and communicating with the interior thereof, a buoyant float carried movably by said body member, an axle fixed in said float and disposed for longitudinal sliding movement in said spool, said axle being adapted by the movement of said float to be withdrawn above or to extend downwardly through said notch, a fishing line attached frictionally intermediate its ends to said body member at the upper end of said body and extending beyond the point of attachment thereto, said extended portion being adapted to be wound on said spool, a sinker attached to the extended end of said line, and an eye member fixed to said sinker and normally extending into said notch and being engaged by said axle to secure said sinker to said body member, said axle being withdrawn from said eye to release said sinker when said float is caused to rise relative to said body member by the depositing of said device in water.

3. A fishing device comprising, in combination, a non-buoyant body member having at its lower end a depending hollow spool, said spool having a side notch formed therein adjacent the lower end thereof and communicating with the interior thereof, a buoyant float carried movably by said body member, an axle fixed in said float and disposed for longitudinal sliding movement in said spool, said axle being adapted by the movement of said float to be withdrawn above or to extend downwardly through said notch, a fishing line attached frictionally intermediate its ends to said body member at the upper end of said body and extending beyond the point of attachment thereto, said extended portion being adapted to be wound on said spool with the last turn thereof laid in said notch, and a sinker attached to the extreme end of said extended line portion, whereby when a portion of said line is disposed in said notch downward movement of said float relative to said body member causes said axle to extend through said notch to secure said line against unwinding from said spool, said axle being withdrawn from said notch to release said sinker when said float is caused to rise relative to said body member by the depositing of said device in water.

References Cited in the file of this patent

UNITED STATES PATENTS

| | | |
|---|---|---|
| 755,683 | Miller | Mar. 29, 1904 |
| 1,296,370 | Darling | Mar. 4, 1919 |
| 2,562,054 | Mathieu | July 24, 1951 |
| 2,607,154 | Martens | Aug. 19, 1952 |